UNITED STATES PATENT OFFICE.

JAMES McGINNIS, OF BALTIMORE, MARYLAND.

PROCESS OF SOLDERING CANS, &c.

SPECIFICATION forming part of Letters Patent No. 685,483, dated October 29, 1901.

Application filed June 28, 1901. Serial No. 66,447. (No specimens.)

*To all whom it may concern:*

Be it known that I, JAMES MCGINNIS, a citizen of the United States, residing at Baltimore, in the State of Maryland, have invented certain new and useful Improvements in Processes of Soldering Cans or Like Vessels; and I do hereby declare the following to be a full, clear, and exact description of the invention, such as will enable others skilled in the art to which it appertains to make and use the same.

My invention relates to an improved process of soldering cans or like vessels.

It has for its object, among other things, to provide for the application of the solder in its molten state economically and without any appreciable waste and yet effectively and with facility and to the greatest advantage.

It consists in conducting the melting separately of certain metals, such as would form in combination the solder, and finally in combining or causing the flowing together in their molten state of said metals and delivering or applying the same from a common point to the article or vessel to be treated, substantially as hereinafter more fully disclosed, and specifically pointed out by the claims.

In practicing my process I employ, say, several crucibles or receptacles suitably arranged or disposed to be subjected to a heating action, placing therein the required metals, one kind of metal in each crucible. The heat of each crucible is raised to the required temperature to effect the melting of its contents, according as to whether it be tin, zinc, or lead. The thus separate melting of said metals or other metals whose combination it may be desired to employ to form the solder prevents the loss by the passing off as fumes of the metal whose melting-point may be less or much less than that of any of the other metals or the formation of a dross due to the excessive boiling of the metal, as would result in the melting of the same in a common crucible, as is apparent.

The molten metal is directed or delivered through suitable means or tubes suitably connecting with said crucibles and brought together at a common point at their discharging ends into a receptacle or tank below containing means for directly applying the molten solder to the can or vessel for treatment passed along thereunder by suitable mechanical means. The commingled molten metal after delivery into the receptacle finally receiving it is subjected to a stirring action to effect the more intimate union or mixing of the ingredients.

Having thus fully described my invention, what I claim, and desire to secure by Letters Patent, is—

1. The described process for soldering purposes, which consists in separately melting different metals, and continuously combining and delivering or applying the same while yet in a molten state, substantially as described.

2. The described process for soldering purposes, which consists in separately heating different metals, raising the temperature thereof according to their respective melting-points, and continuously applying or delivering the commingled metals, substantially as described.

3. The described process for soldering purposes, which consists in separately melting different metals, combining the same in their molten state and immediately delivering the same into a receptacle for application while yet in a molten state to the article to be treated, substantially as described.

In testimony whereof I affix my signature in presence of two witnesses.

JAMES McGINNIS.

Witnesses:
   J. WM. SHEFFER,
   D. H. MILLER.